US011440306B2

(12) United States Patent
Trpkovski et al.

(10) Patent No.: US 11,440,306 B2
(45) Date of Patent: Sep. 13, 2022

(54) GANTRY BASED FILM APPLICATOR SYSTEM

(71) Applicant: PDS IG Holding LLC, Prairie Du Sac, WI (US)

(72) Inventors: Paul Trpkovski, Kailua Kona, HI (US); Michael David Kayartz, Portage, WI (US)

(73) Assignee: PDS IG Holdings LLC, Prairie Du Sac, WI (US)

( * ) Notice: Subject to any disclaimer, the term of this patent is extended or adjusted under 35 U.S.C. 154(b) by 0 days.

(21) Appl. No.: 16/739,771

(22) Filed: Jan. 10, 2020

(65) Prior Publication Data

US 2020/0223203 A1 Jul. 16, 2020

Related U.S. Application Data

(60) Provisional application No. 62/791,199, filed on Jan. 11, 2019.

(51) Int. Cl.
*B32B 37/00* (2006.01)
*B32B 37/10* (2006.01)
(Continued)

(52) U.S. Cl.
CPC ...... *B32B 37/0053* (2013.01); *B32B 37/1018* (2013.01); *B29C 63/024* (2013.01);
(Continued)

(58) Field of Classification Search
CPC . B29C 70/386; B29C 70/388; B29C 65/5092; B29C 63/024; Y10T 156/1788;
(Continued)

(56) References Cited

U.S. PATENT DOCUMENTS 1,996,191 A  4/1935  Cook
4,039,370 A  8/1977  Kleinknecht
(Continued)

FOREIGN PATENT DOCUMENTS

DE  10260587  7/2004
EP  2733128  5/2014
(Continued)

OTHER PUBLICATIONS

Cassity, "Faux Frosted Glass Tutorial," REMODELaholic 2010 retrieved from URL <https://www.remodelaholic.com/faux-frosted-glass-guest/> Aug. 21, 2018 (17 pages).
(Continued)

*Primary Examiner* — Carson Gross
(74) *Attorney, Agent, or Firm* — Pauly, DeVries Smith & Deffner LLC

(57) ABSTRACT

Various embodiments provide a masking system to apply a mask to a workpiece, comprising: a frame structure, an application head, an X-axis movement element, a Y-axis movement element, a Z-axis movement element, and a workpiece movement element. The frame structure comprising a workpiece support. The application head can be configured to apply film to a workpiece. The application head can comprise a vacuum roller comprising a rotatable cylindrical body with an outer surface; a film roll comprising film wrapped around a spool; a cutting element configured to cut the film to separate a portion of the film from a remainder of film on the film of the film roll, and a guide element disposed between the film roll and the vacuum roller. The guide element is moveable. The guide element is configured to contact an unwound portion of the film between the film roll and the vacuum roller.

12 Claims, 16 Drawing Sheets

(51) Int. Cl.
*B29C 63/02* (2006.01)
*B29C 70/38* (2006.01)

(52) U.S. Cl.
CPC ....... *B29C 70/388* (2013.01); *B32B 2037/109* (2013.01); *Y10T 156/1348* (2015.01); *Y10T 156/1788* (2015.01)

(58) Field of Classification Search
CPC .............. Y10T 156/1348; B65H 20/12; B65H 2301/44336; B65H 2404/1362; B65H 2404/1363; B65H 2406/33
USPC .................................................. 156/504, 505
See application file for complete search history.

(56) References Cited

U.S. PATENT DOCUMENTS

| | | | |
|---|---|---|---|
| 4,730,526 A * | 3/1988 | Pearl | B26D 7/018 198/689.1 |
| 5,032,211 A * | 7/1991 | Shinno | B29C 70/386 156/361 |
| 5,866,260 A | 2/1999 | Mccammon et al. | |
| 6,973,759 B2 | 12/2005 | Trpkovski | |
| 7,025,850 B2 | 4/2006 | Trpkovski | |
| 7,083,699 B2 | 8/2006 | Trpkovski | |
| 7,165,591 B2 | 1/2007 | Trpkovski | |
| 7,691,220 B2 | 4/2010 | Jean-Pierre et al. | |
| 8,454,788 B2 * | 6/2013 | Kisch | B29C 70/388 156/256 |
| 8,652,576 B2 | 2/2014 | Gonzalez et al. | |
| 10,246,936 B2 | 4/2019 | Trpkovski | |
| 10,479,063 B2 | 11/2019 | Trpkovski | |
| 2003/0012981 A1 | 1/2003 | Yamada et al. | |
| 2003/0041532 A1* | 3/2003 | Trpkovski | E04G 21/30 52/105 |
| 2003/0041533 A1 | 3/2003 | Trpkovski et al. | |
| 2003/0041534 A1 | 3/2003 | Trpkovski et al. | |
| 2003/0047538 A1 | 3/2003 | Trpkovski et al. | |
| 2003/0056905 A1* | 3/2003 | Kuhn | B65H 37/002 156/523 |
| 2003/0087592 A1 | 5/2003 | Trpkovski et al. | |
| 2003/0121218 A1 | 7/2003 | Spindler et al. | |
| 2003/0213187 A1 | 11/2003 | Trpkovski et al. | |
| 2004/0031215 A1 | 2/2004 | Trpkovski et al. | |
| 2004/0123627 A1 | 7/2004 | Larsen et al. | |
| 2007/0221811 A1 | 9/2007 | Hauser et al. | |
| 2009/0162623 A1 | 6/2009 | Foresti et al. | |
| 2009/0176021 A1 | 7/2009 | Walsh et al. | |
| 2012/0243054 A1 | 9/2012 | Sellers | |
| 2016/0176150 A1 | 6/2016 | Trpkovski | |
| 2016/0176171 A1 | 6/2016 | Trpkovski | |
| 2016/0177621 A1 | 6/2016 | Trpkovski | |

FOREIGN PATENT DOCUMENTS

| | | | | |
|---|---|---|---|---|
| FR | 2465693 | | 3/1981 | |
| GB | 2263440 | | 7/1993 | |
| GB | 2325453 | A * | 11/1998 | ......... B65H 35/0013 |
| WO | 03021054 | | 3/2003 | |
| WO | 2004085135 | | 11/2004 | |
| WO | 2004094283 | | 11/2004 | |
| WO | 2007060353 | | 5/2007 | |
| WO | 2011086340 | | 7/2011 | |
| WO | 2013026492 | | 2/2013 | |
| WO | 2014075729 | | 5/2014 | |
| WO | 2016100855 | | 6/2016 | |
| WO | 2016100860 | | 6/2016 | |
| WO | 2016100907 | | 6/2016 | |

OTHER PUBLICATIONS

"Definition of term Strip," Merriam Webster Dictionary retrieved from URL <https://www.merriam-webster.com/dictionary/strip> in 2019 (15 pages).
File History for U.S. Appl. No. 14/973,229 downloaded May 14, 2020 (297 pages).
File History for U.S. Appl. No. 14/973,291 downloaded May 14, 2020 (257 pages).
File History for U.S. Appl. No. 14/973,348, downloaded May 14, 2020 (200 pages).
"International Preliminary Reporton Patentability," for PCT Application No. PCT/US2015/066751 dated Jun. 29, 2017 (10 pages).
"International Preliminary Reporton Patentability," for PCT Application No. PCT/US2015/066765 dated Jun. 29, 2017 (13 pages).
"International Preliminary Reporton Patentability," for PCT Application No. PCT/US2015/066856 dated Jun. 29, 2017 (10 pages).
"International Search Report and Written Opinion," for PCT Application No. PCT/US2015/066751, dated Apr. 14, 2016 (13 pages).
"International Search Report and Written Opinion," for PCT Application No. PCT/US2015/066765, dated Jun. 22, 2016 (19 pages).
"International Search Report and Written Opinion," for PCT Application No. PCT/US2015/066856, dated Mar. 29, 2016 (14 pages).
"Invitation to Pay Additional Fees and Partial Search Report," for PCT Application No. PCT/US2015/066765, dated Apr. 1, 2016 (6 pages).

* cited by examiner

GANTRY BASED FILM APPLICATOR SYSTEM

This application claims the benefit of U.S. Provisional Application No. 62/791,199, filed Jan. 11, 2019, the content of which is herein incorporated by reference in its entirety.

FIELD

Embodiments herein relate to a system of applying a masking material to a workpiece. More specifically, various embodiments relate to applying a masking material with a roller.

BACKGROUND

Nearly all new buildings and homes have windows. Windows frequently include at least one fragile glass pane disposed within a frame. It is frequently desired that the windows are clear and easy to see through; therefore, the glass is normally desired to be free of scratches, cracks or chips. The assembly of the frame around the glass can subject the glass to being damaged. Similarly, transportation of the window or installation of the window can also subject the glass to being damaged.

Accordingly, there is a need for a system and method to apply a protective coating to the glass that can be removed at some time after the window is installed.

SUMMARY

In an embodiment, a masking system to apply a mask to a workpiece is included. The system having a frame structure that can include a workpiece support, wherein the workpiece support is configured to maintain the location of the workpiece while the mask is applied to the workpiece. The system can include an application head configured to apply film to a workpiece. The application head includes a vacuum roller that can include a rotatable cylindrical body with an outer surface. The application head includes a film roll that can include film wrapped around a spool. The application head includes a cutting element configured to cut the film to separate a portion of the film from a remainder of film on the film of the film roll. The application head includes a guide element disposed between the film roll and the vacuum roller. The guide element is moveable. The guide element is configured to contact an unwound portion of the film to maintain a constant tension of the film between the film roll and the vacuum roller. The system includes an X-axis movement element configured to move the application head relative to the frame structure along an x-axis. The system includes a Y-axis movement element configured to move the application head relative to the frame structure along a Y-axis. The system includes a Z-axis movement element configured to move the application head relative to the frame structure along a Z-axis. The system includes a workpiece movement element configured to move the workpiece relative to the frame structure.

In an embodiment, the application head further includes a wiper element arranged to follow the vacuum roller, such that the wiper element contacts film that has been applied to the workpiece.

In an embodiment, the workpiece movement element includes a conveyor belt, motorized rollers, or a robot arm.

In an embodiment, the cutting element is arranged to cut the film on the vacuum roller or between the film roll and the vacuum roller.

In an embodiment, the frame structure includes a workpiece entry and a workpiece exit, the workpiece entry includes a workpiece measuring element configured to measure a height of the workpiece, a width of the workpiece, or the height and the width of the workpiece.

In an embodiment, the masking system is configured to calculate the desired mask size based on the measured height of the workpiece, the measured width of the workpiece, or the measured height and width of the workpiece.

In an embodiment, the guide element is configured to maintain a constant angular position of first contact between the film and the vacuum roller.

In an embodiment, the film roll includes an unwind motor configured to rotate the spool.

In an embodiment, the film roll includes a film roll diameter sensor configured to measure a diameter of the film roll.

In an embodiment, the unwind motor has a variable unwind speed, wherein the unwind speed is adjusted to ensure a tension of an unwound film portion remains constant.

In an embodiment, the unwind motor is configured to unwind film from the film roll at the same speed at which film is applied to the workpiece from the vacuum roller.

In an embodiment, a method of applying a mask to a workpiece, is included, the method includes inserting a film roll into an application head. The film roll includes film wrapped around a spool. The method includes unwinding film from the film roll, at least partially, to place a first end of the film from the film roll on a vacuum roller of the application head. The method includes holding the end of the film from the film roll on the vacuum roller with a vacuum force. The method includes transporting a workpiece into a known position relative to the vacuum roller. The method includes rotating the vacuum roller to align the end of the film from the film roll with an intended location of the mask. The method includes moving the application head into a position where film on the vacuum roller contacts the workpiece thereby attaching film to the workpiece via an adhesive on the film. The method includes moving the application head along the workpiece to apply film to the workpiece. The method includes rotating the vacuum roller as the application head moves along the workpiece. The method includes unwinding additional film from the film roll to provide the additional film to the vacuum roller as film is applied to the workpiece. The method includes cutting the film from the film roll.

In an embodiment, cutting the film from the film roll occurs at a location between the film roll and the vacuum roller or a location on the vacuum roller to separate a first portion of film from a second portion of film, wherein the first portion of film includes the first end and a second end, and the second portion of film includes the film on the film roll.

In an embodiment, the method further can include: applying the second end of the first portion of film onto the workpiece by moving the application head along the workpiece after the first portion of film has been separated from the second portion of film.

In an embodiment, the method further can include measuring a length and a width of the workpiece as the workpiece is transported to the known position.

In an embodiment, the method further can include calculating a size of the mask to be applied to the workpiece based on the measured height and length of the workpiece.

In an embodiment, the method further can include moving a guide element into contact with the film between the film roll and the vacuum roller.

In an embodiment, the method further can include following the vacuum roller with a wiper of the application head that contacts the film applied to the workpiece.

In an embodiment, the method further can include moving the application head away from the workpiece after the film has been cut.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

A mask can be applied to an exterior glass surface of a window or a window component, such as to protect the glass from damage during assembly, transportation and installation. The mask can be applied to a window component, such as a glass unit. In various embodiments, a glass unit includes one or more panes of glass, such as two or three panes of glass that are sealed together and optionally have a space between. The mask can be applied to an inside area of the external surface of the glass, such as to leave a perimeter region that is unmasked. In some embodiments, a frame can be coupled to the glass unit. The frame can substantially cover the unmasked perimeter region. Therefore, in some embodiments, the external surface of the glass can be substantially covered by the mask and the frame prior to transporting the window or installing the window. In various embodiments, a mask can include one or more strips of film.

Various embodiments disclosed herein include a system for applying a masking material, such as a film, to a workpiece. The system can include a gantry-based film applicator. The system can include an application head which can move along the gantry system. The application head can include a roll of film or other masking material to be disposed onto the workpiece.

Figure 1:
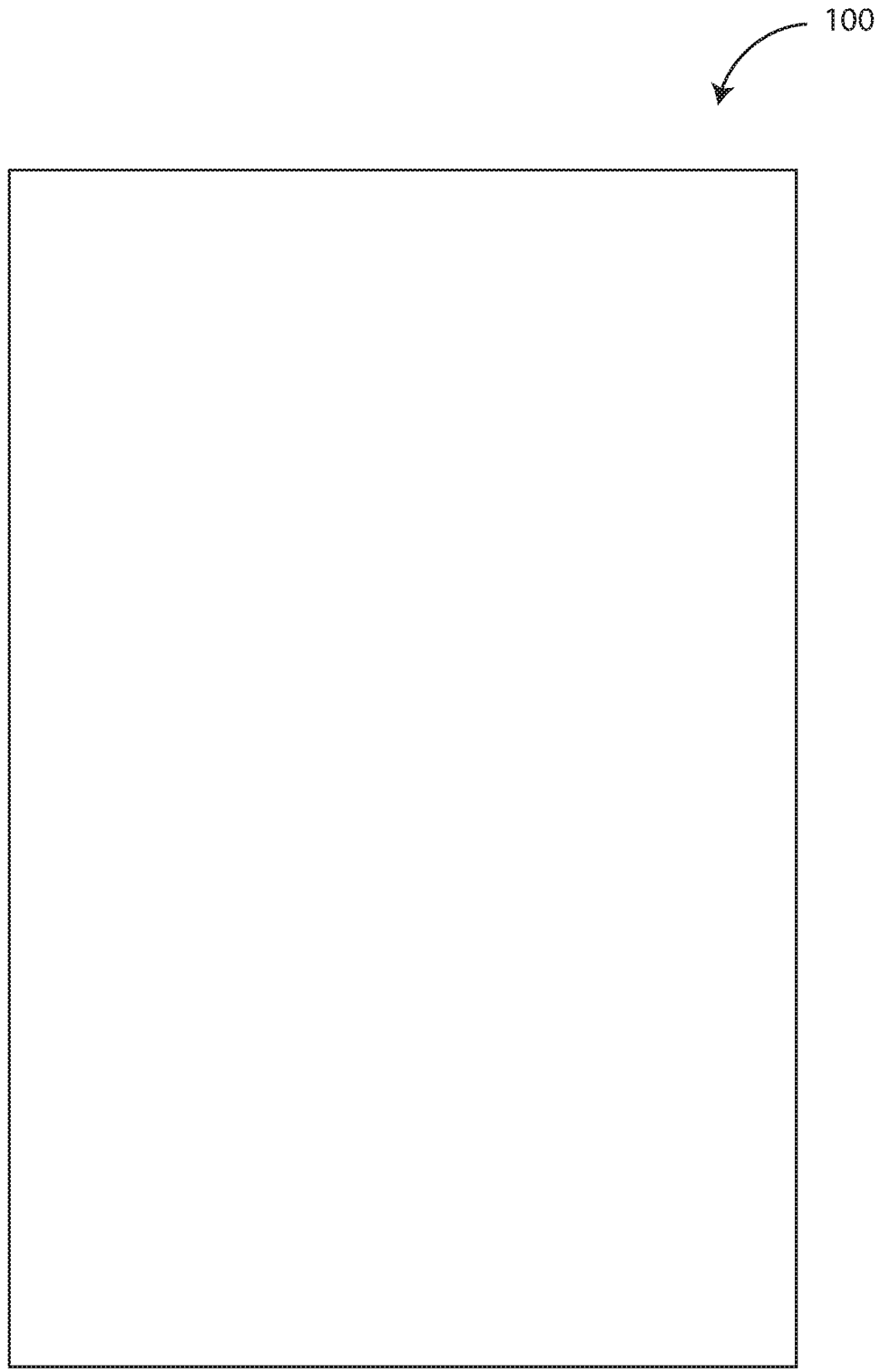
FIG. 1 is a front view of a workpiece in accordance with various embodiments herein.

FIG. 1 is a front view of an unmasked workpiece 100 in accordance with various embodiments herein. In some embodiments, the workpiece 100 can include an insulated glass unit or a monolithic glass. FIG. 1 shows the workpiece 100 in an unmasked state, such as the state of the workpiece 100 prior to entering the system described herein.

Figure 2:
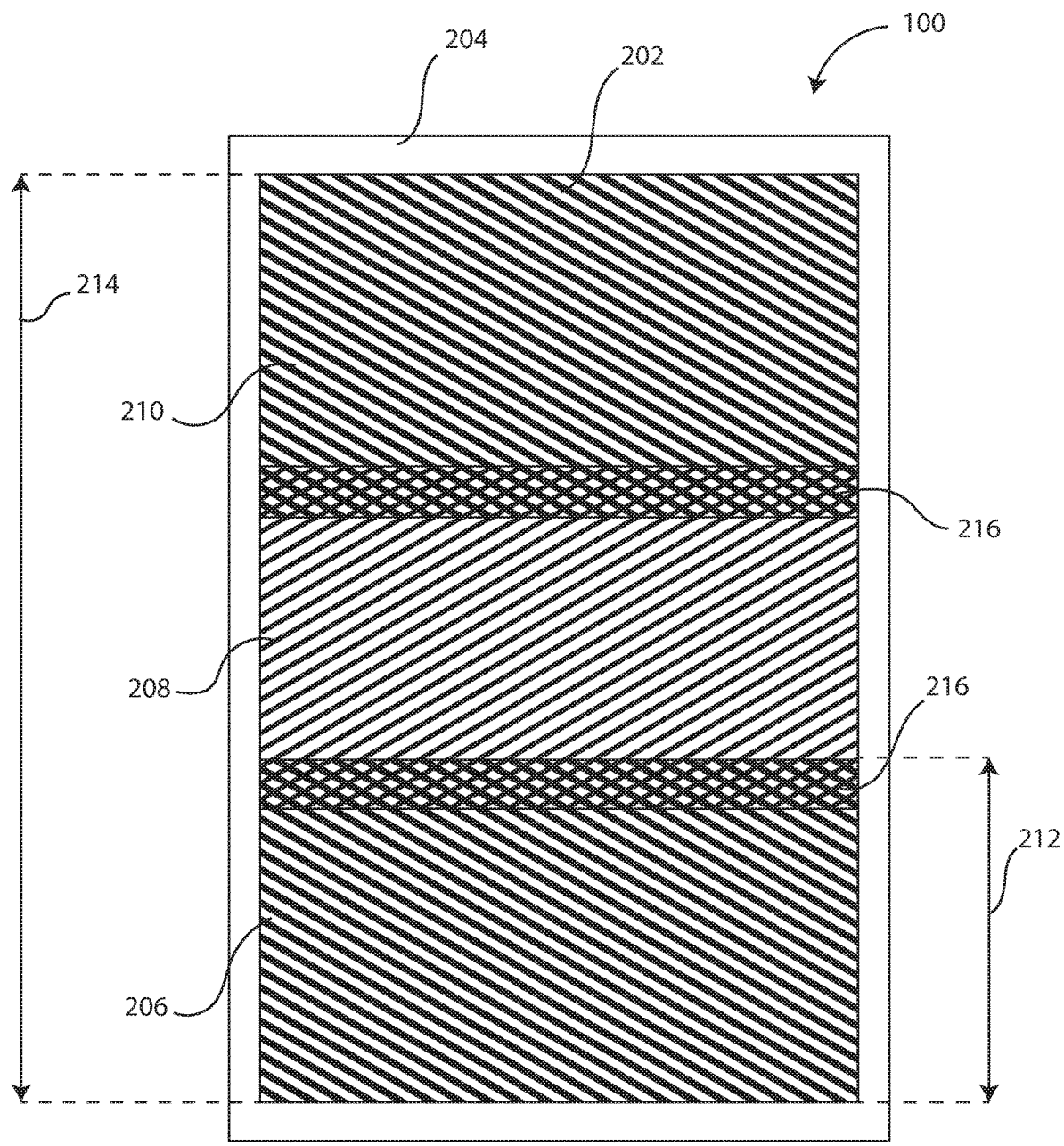
FIG. 2 is a front view of a workpiece in accordance with various embodiments herein.

FIG. 2 shows a front view of a workpiece 100 that has had a mask 202 applied to a surface of the workpiece 100. The masked workpiece 100 can represent the state of a workpiece 100 after the workpiece 100 leaves the system described herein.

The mask 202 can cover a portion of the workpiece 100. The mask 202 can leave an unmasked portion around the perimeter 204 of the workpiece. The mask 202 can include a film or other masking material. In some embodiments, the film can include an inner surface that will contact and adhere to the workpiece 100. The inner surface of the film can include an adhesive to adhere the film to the workpiece 100. In some embodiments, the film can include an outer surface that will be opposite from the workpiece and exposed. The outer surface can be smooth and have a consistent appearance.

In some embodiments, the mask 202 can include several layers, such as a first layer 206, a second layer 208, and a third layer 210. In other embodiments, the mask 202 can include one layer, two layers, four layers, five layers, six layers, or more depending on the height of the film 212 and the height of the mask 214. The mask 202 can include several layers when the height of film 212 is less than height of the mask 214.

In various embodiments, the mask 202 can include one or more overlap sections 216. The overlap sections 216 can be sized based on the film height 212, the mask height 214, and the number of layers of film applied, such that the mask 202 covers the intended portions of the workpiece 100 and leaves an unmasked perimeter 204 of a desired size. In various embodiments, each of the overlap sections 216 can have an equivalent height.

Figure 3:
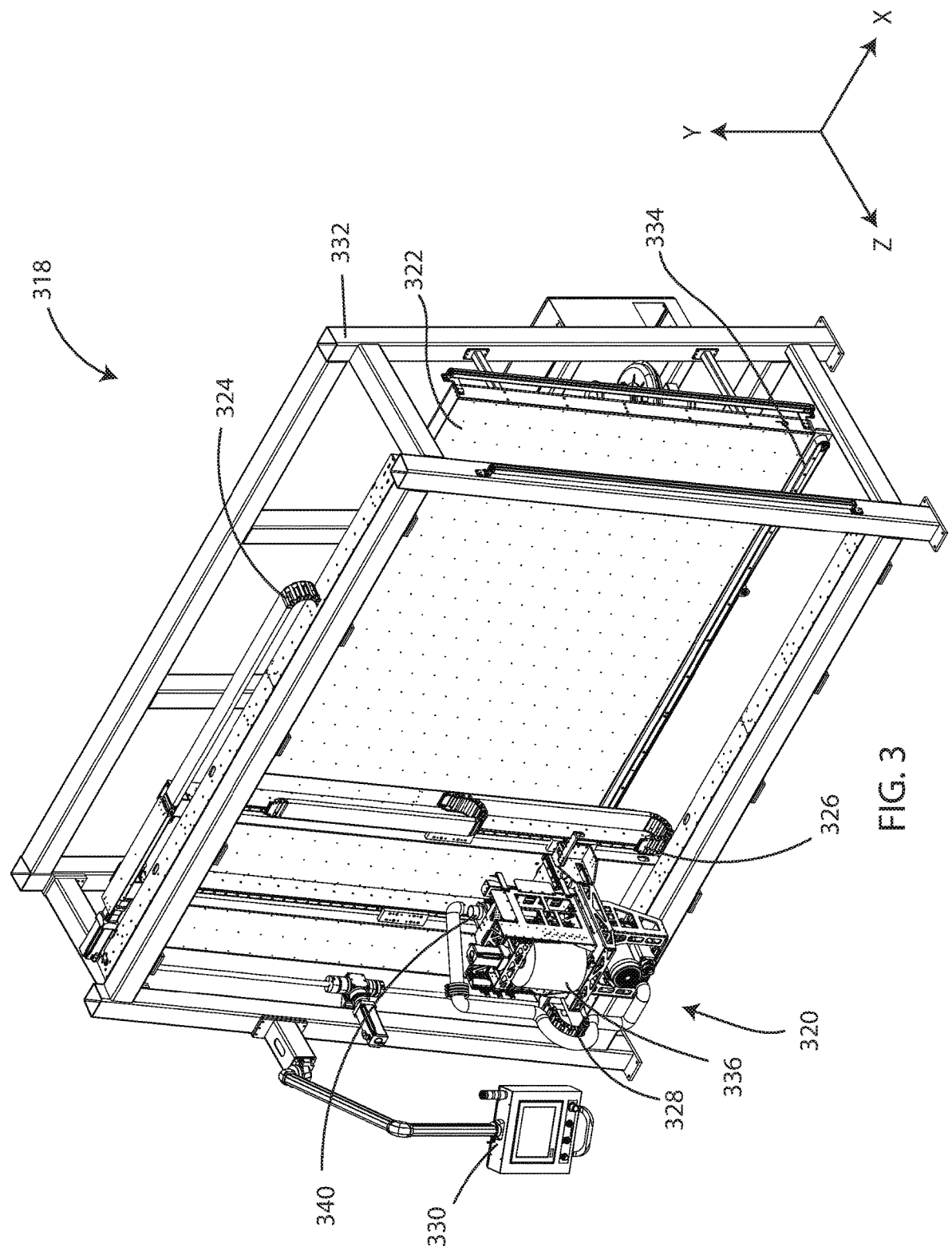
FIG. 3 is a perspective view of a masking system in accordance with various embodiments herein.
Figure 4:
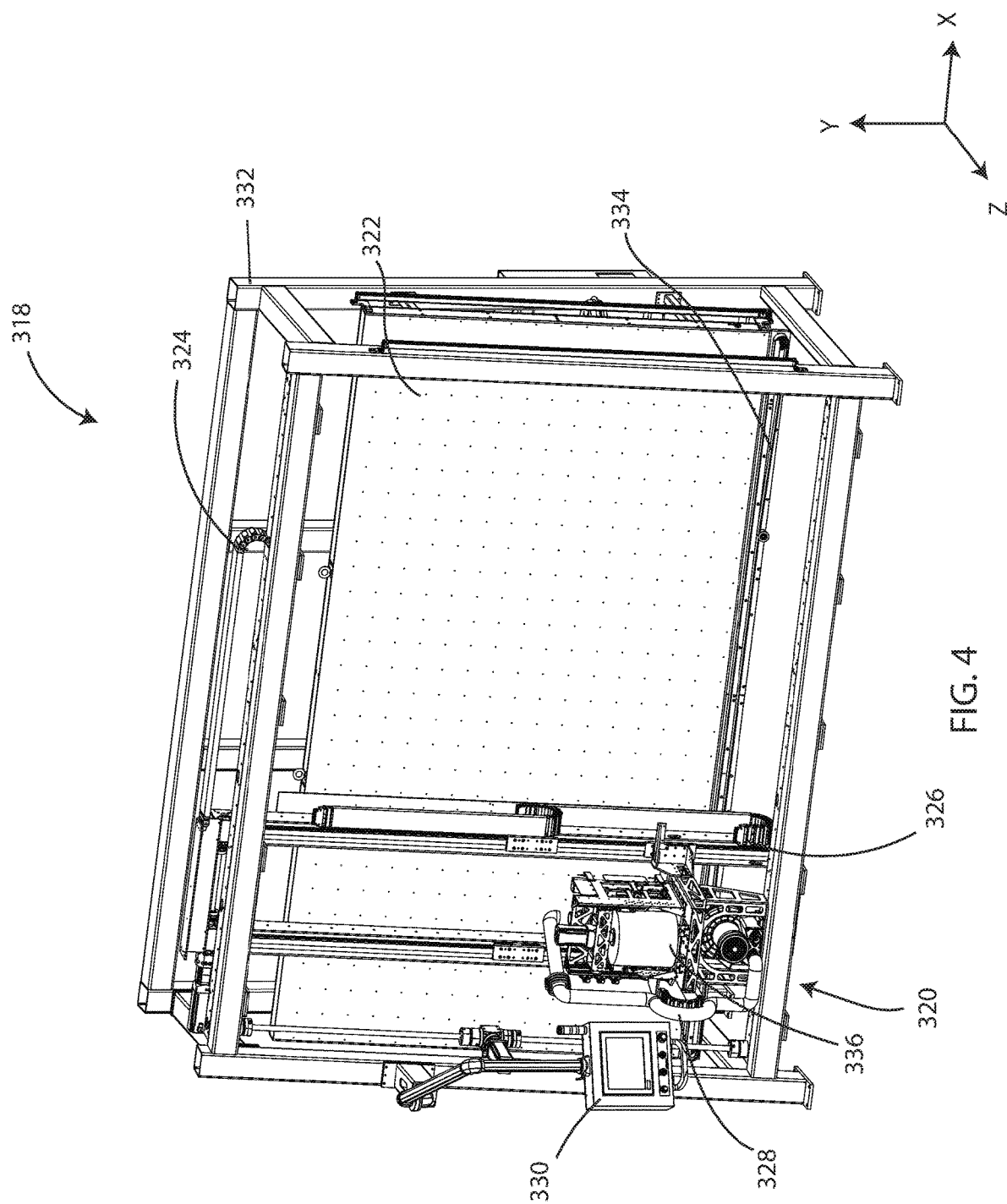
FIG. 4 is a perspective view of a masking system in accordance with various embodiments herein.

In reference now to FIGS. 3 and 4, perspective views of a masking system 318 are shown in accordance with various embodiments. The masking system 318 can be configured to receive an unmasked workpiece 100, apply a masking material in one or more passes to mask at least a portion of the workpiece 100, and output the masked workpiece 100.

The system 318 can include an application head 320, a workpiece support 322, a x-axis movement element 324, a y-axis movement element 326, a z-axis movement element 328, a user interface 330, a frame structure 332, and a workpiece movement element 334.

The X-axis movement element 324 can be configured to move the application head 320 relative to the frame structure 332 along the x-axis. The Y-axis movement element 326 can be configured to move the application head 320 relative to the frame structure 332 along the y-axis. The Z-axis movement element 328 can be configured to move the application head 320 relative to the frame structure 332 along the z-axis. In various embodiments, the movement elements 324, 326, 328, 334 can each include one or more conveyor belts, motorized rollers, robot arms, actuators (such as linear actuators), or pistons (such as pneumatic pistons).

The application head 320 can be configured to locate a workpiece 100 that is supported by the workpiece support 322 and to apply a mask to the workpiece 100. In various embodiments, during the application of the mask, the workpiece 100 can be in a fixed location relative to the workpiece support 322. In some embodiments, the workpiece support 322 can ensure the workpiece 100 maintains a position tangent to the outer surface of the vacuum roller 340.

The application head 320 can move relative to the workpiece 100 to apply the mask to the workpiece 100. In some embodiments, the application head 320 can move along the x-axis to apply the film or masking material to the workpiece 100.

Figure 10:
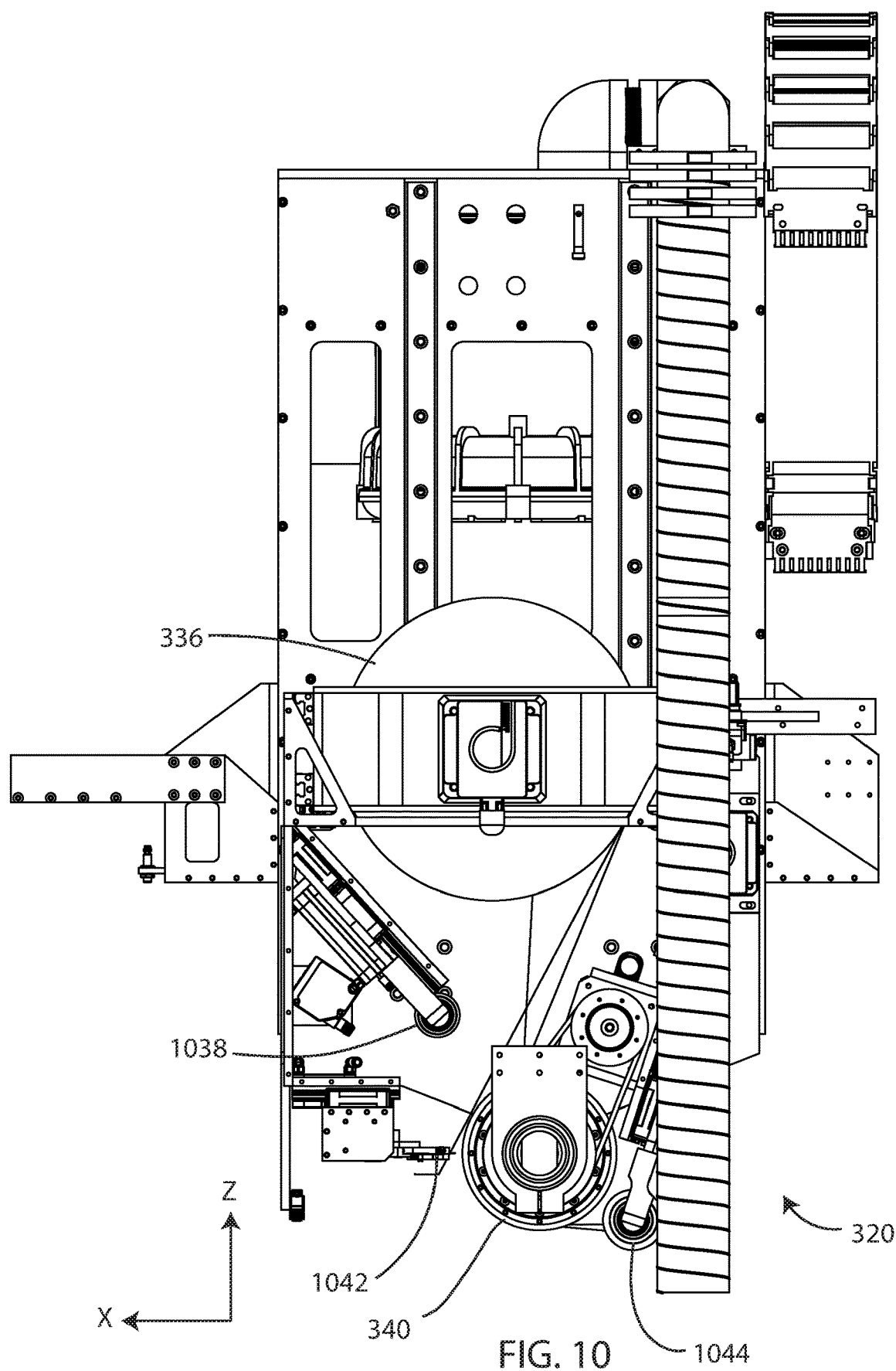
FIG. 10 is a top view of a portion of a masking system in accordance with various embodiments herein.

In various embodiments, the application head 320 can include a film roll 336, a guide element 1038 (shown in FIG. 10), a vacuum roller 340, a cutting element 1042 (shown in FIG. 10), and a wiper element 1044 (shown in FIG. 10).

In various embodiments, the film roll 336 can include a supply of film or masking material. In some embodiments, the masking material can be a thin film, such as a film with a thickness less than 1 mm, 2 mm, 3 mm, 4 mm, or 5 mm. The film can be wound around a spool, a cylinder, or another object to store the film that is intended to be used as a mask. In various embodiments, the film roll 336 can travel with the application head 320. In various embodiments, the film roll 336 can include a motor. The motor can control the rate at which film is dispensed from the film roll 336. The motor can control the rate at which the roll is unwound as film is removed from the film roll 336 and placed onto the workpiece 100. In some embodiments, the motor can unwind the film roll 336 at the same rate that the film is applied to the workpiece, such as to maintain consistent tension on the film. In various embodiments, the application head 320 and/or the film roll 336 can include a film roll diameter sensor configured to measure the diameter of the film roll 336, which will decrease as film is unwound from the film roll 336. The film roll diameter sensor can be in communication with the motor of the film roll to account for changes in the film roll diameter.

The film can be dispensed from the film roll 336 and guided by a guide element 1038 onto the vacuum roller 340. The guide element 1038 can move relative to the path of the film between the film roll 336 and the vacuum roller 340, such as to maintain a constant position of first contact between the film and the vacuum roller 340.

The film can be held against the outer surface of the vacuum roller 340 prior to being placed onto the workpiece by a vacuum force. The vacuum roller 340 can rotate around an axis that is perpendicular to the direction in which the application head 320 moves while applying a layer of film to the workpiece.

In some embodiments, the vacuum roller 340 can be substantially cylindrical, such as having a cylindrical body, and can rotate around an axis. The surface of the vacuum roller 340 can define a plurality of apertures 946 (shown in FIG. 9). The vacuum roller 340 can be connected to a vacuum source, such as a source to supply a vacuum or negative pressure. The apertures 946 can allow the outside surface of the film (the surface that will face away from the workpiece) to be held against the vacuum roller 340. The vacuum roller 340 can rotate as the application head 320 moves along the workpiece 100 to transfer film to the workpiece 100.

The x-axis movement element 324 can be configured to move the application head 320 along the x-axis, such as while applying the film to the workpiece. The y-axis movement element 326 can be configured to move the application head 320 along the y-axis, such as to move the application head 320 relative to the workpiece 100 after completing a layer and moving in to a position to initiate the application of a subsequent layer. The z-axis movement element 328 can be configured to move the application head 320 along the z-axis, such as to move the application head 320 away from the workpiece 100 after completing a layer of film or to move the application head 320 towards the workpiece 100 prior to starting the application of a layer to the workpiece 100.

In various embodiments, the user interface 330 can be used to control the system 318, such as to turn the masking system 318 ON/OFF. The user interface 330 can also display information to a user, such as cycle time or number of workpieces that have been masked. The user interface 330 can further display warnings to a user, such as a warning indicating that the film on the film roll 336 is low or gone.

In various embodiments, the system 318 can include a frame structure 332. The frame structure 332 can provide a base for the system 318. Various components can be coupled to the frame structure 332. In some embodiments, the frame structure 332 can surround the workpiece support 322. In various embodiments, the frame structure 332 can include a workpiece support 322. The workpiece support can be configured to maintain the location of the workpiece while the mask is applied to the workpiece. In some embodiments, the workpiece movement element can include the workpiece support. In some embodiments, the workpiece support can maintain the workpiece in a vertical or upright position. In some embodiments, the workpiece support can maintain the workpiece in a position that is slightly offset from vertical, such as 2°, 3°, 4°, 5°, 10°, 15°, or 20° from vertical.

The workpiece 100 can be transported into, within, and out of the system 318 via the workpiece movement element 334. In some embodiments, the workpiece movement element 334 can include a conveyor or motorized rollers. The workpiece movement element 334 can be configured to move the workpiece 100 into the system 318, to move the masked workpiece 100 to the workpiece support 322, and to move the workpiece 100 out of the system 318. The workpiece movement element 334 can be configured to move the workpiece 100 relative to the frame structure 332.

In various embodiments, the workpiece support 322 can be configured to receive the workpiece 100 in a known location, such as a corner of the workpiece 100 being located in a known location in order for the application head 320 to accurately place the mask on the workpiece 100. In some embodiments, the workpiece support 322 can support the workpiece 100 while the mask is applied. In some embodiments, the workpiece support 322 can hold or retain the workpiece 100 in a fixed location while the mask is applied.

In some embodiments, as the workpiece 100 enters the system 318, the system 318 can measure or record the length of the workpiece 100, such as to establish a length of the mask. Similarly, the system 318 can also measure or record the height of the workpiece 100 to establish a height of the mask.

Figure 5:
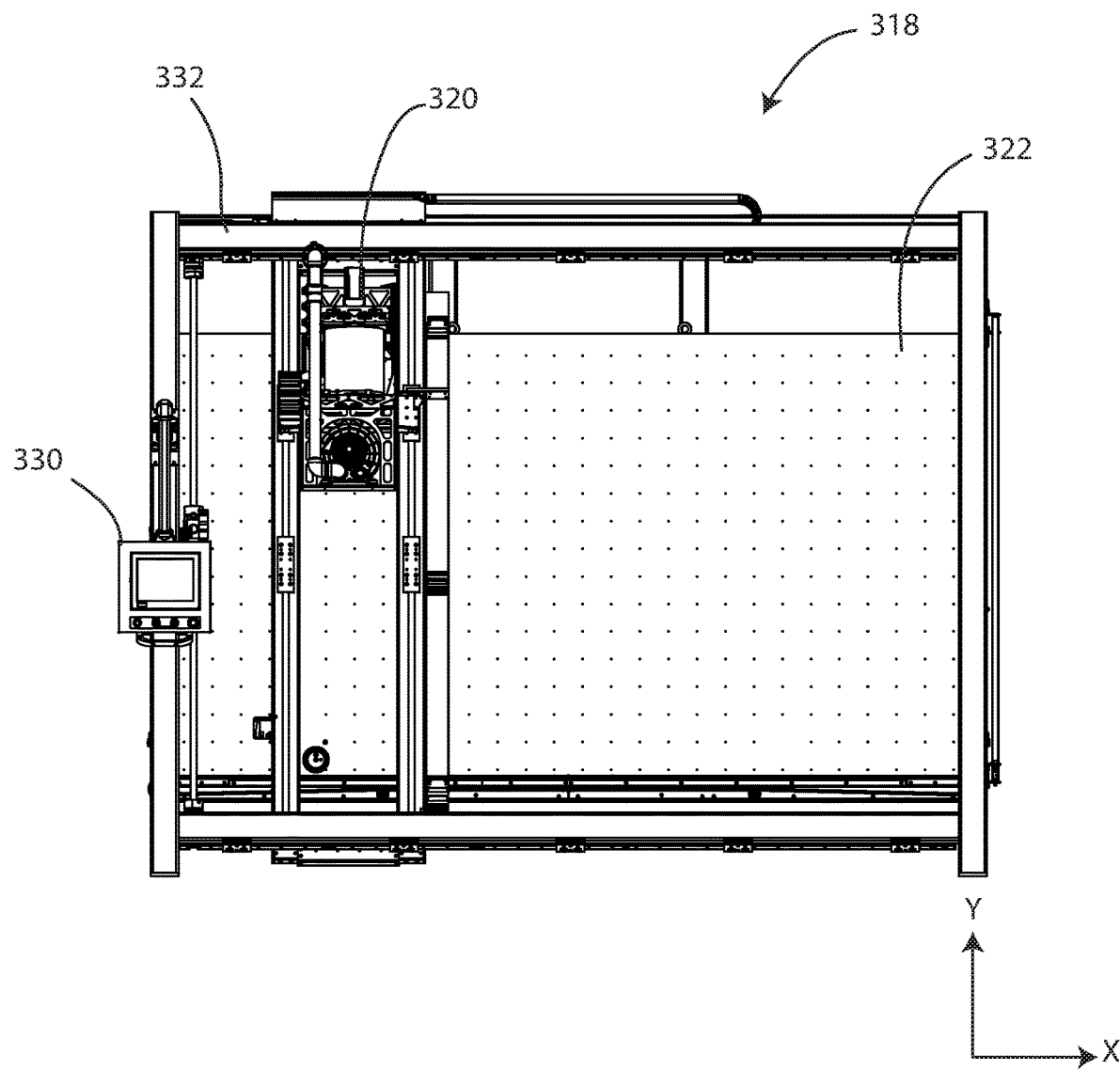
FIG. 5 is a front view of a masking system in accordance with various embodiments herein.
Figure 6:
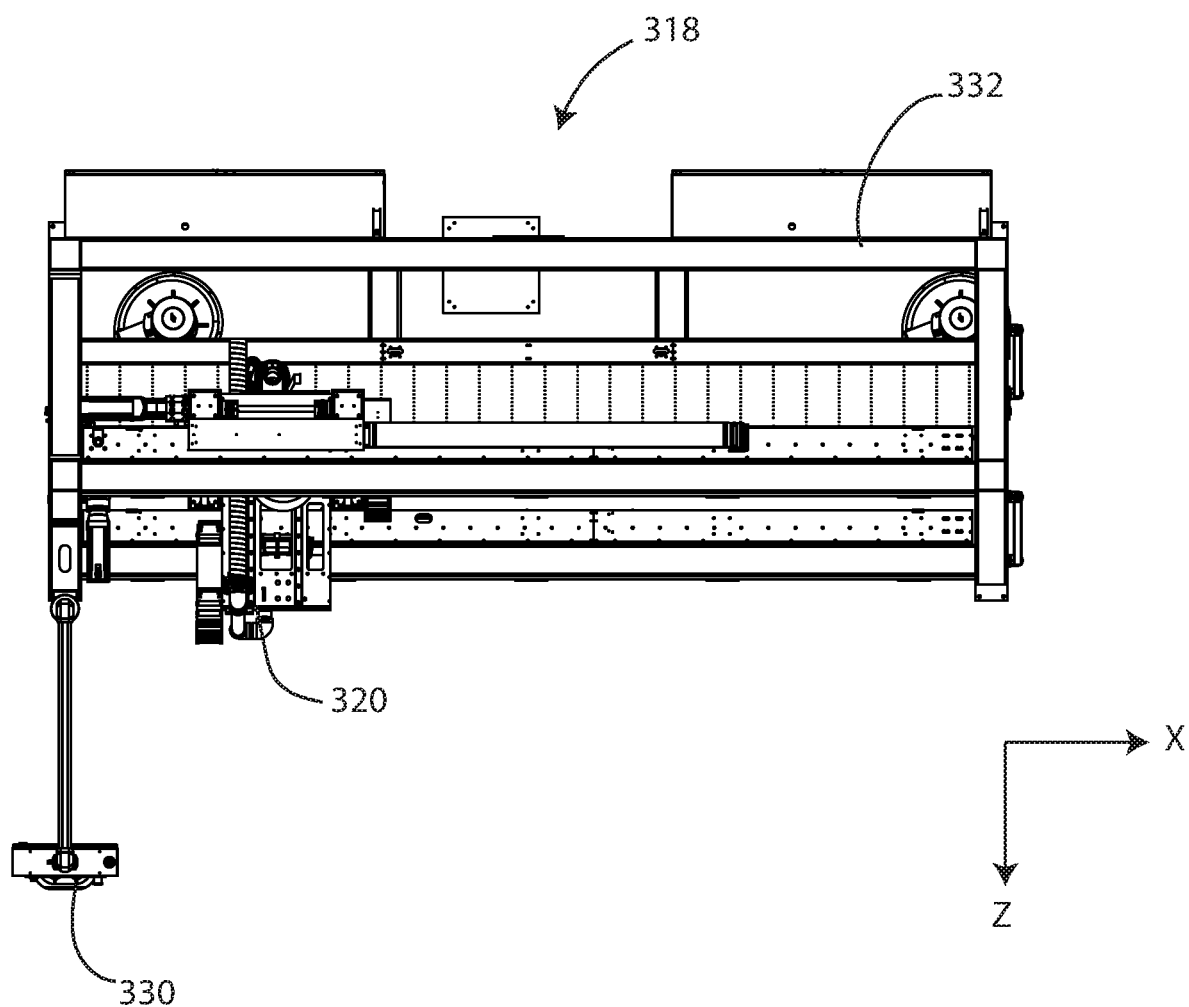
FIG. 6 is a top view of a masking system in accordance with various embodiments herein.
Figure 7:
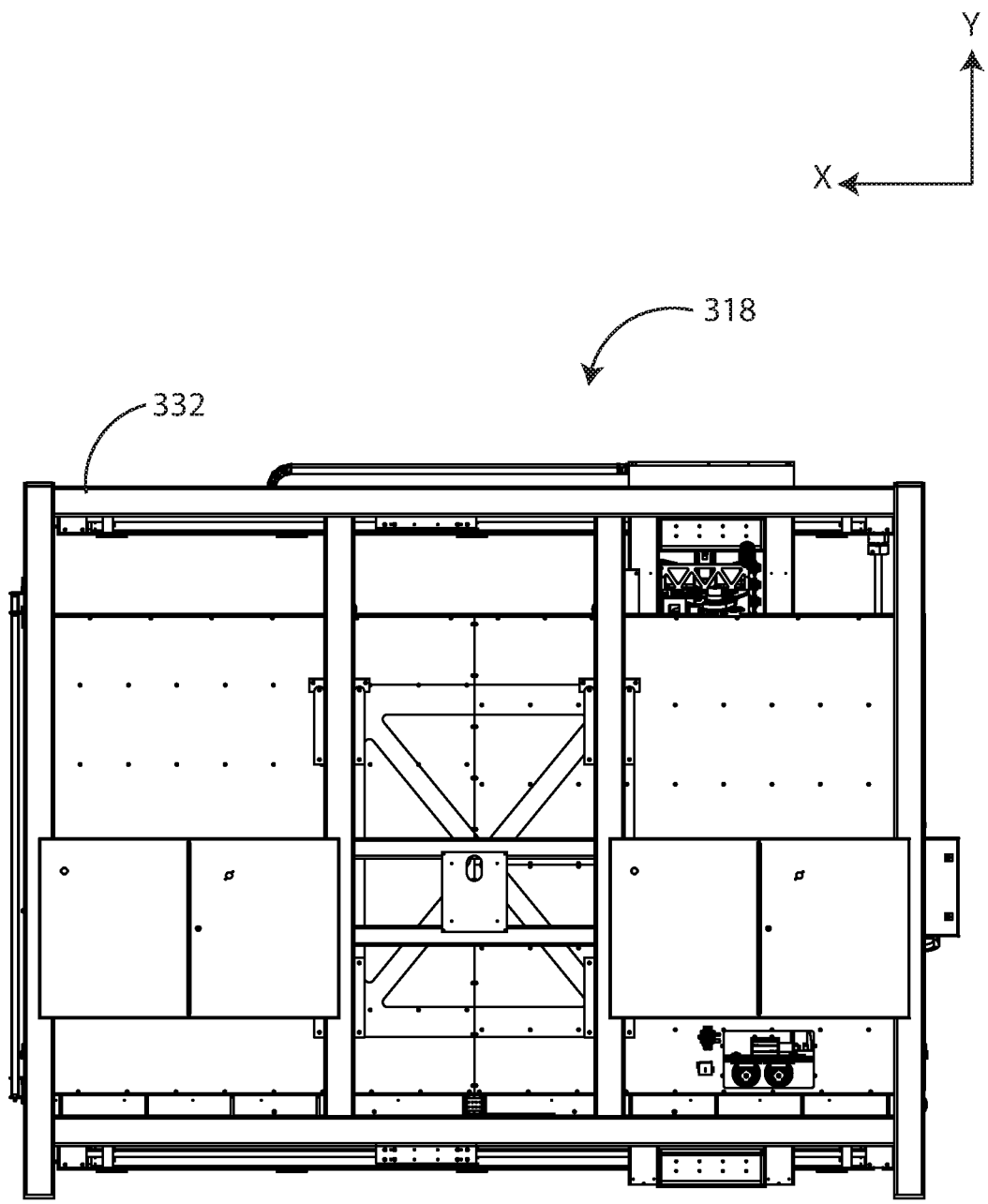
FIG. 7 is a back view of a masking system in accordance with various embodiments herein.
Figure 8:
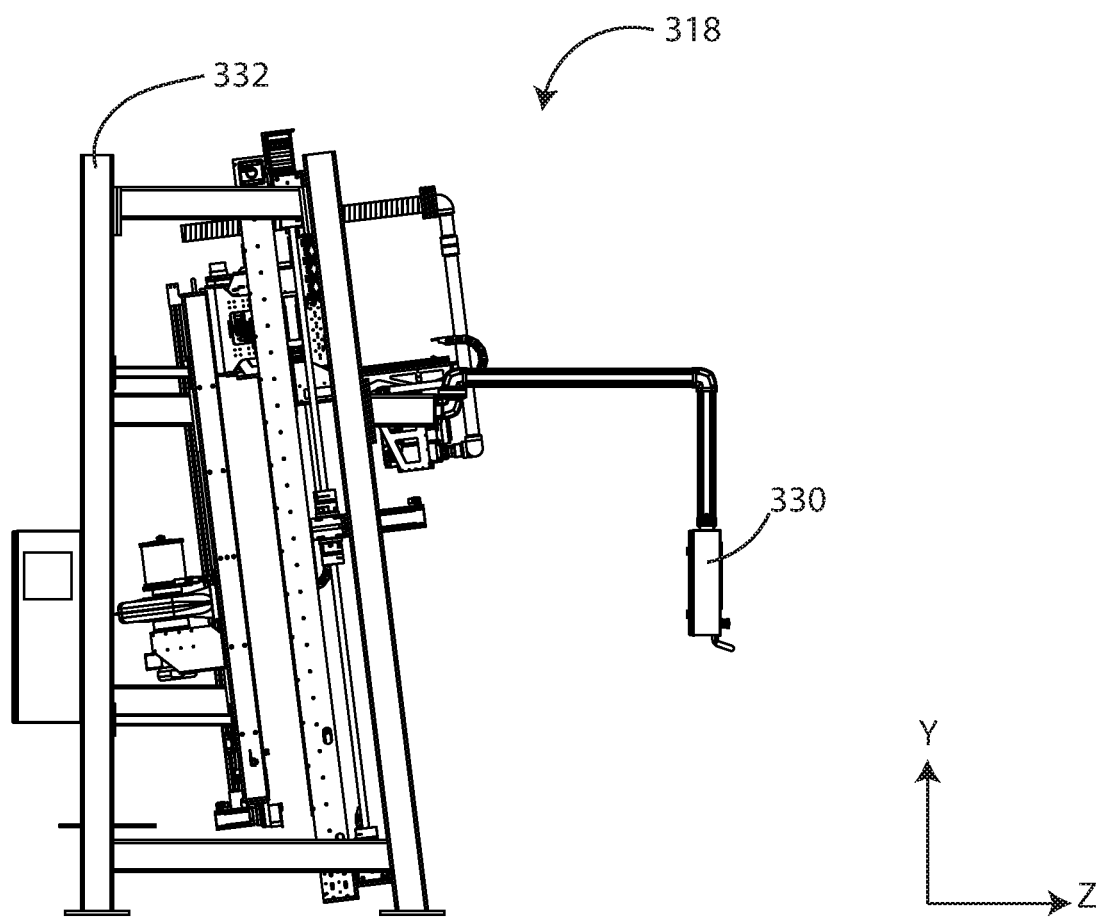
FIG. 8 is a side view of a masking system in accordance with various embodiments herein.

FIG. 5 shows a front view of the masking system 318 in accordance with various embodiments herein. FIG. 6 shows a top view of the masking system 318. FIG. 7 shows a back view of the masking system 318. FIG. 8 shows a side view of a masking system 318.

Figure 9:
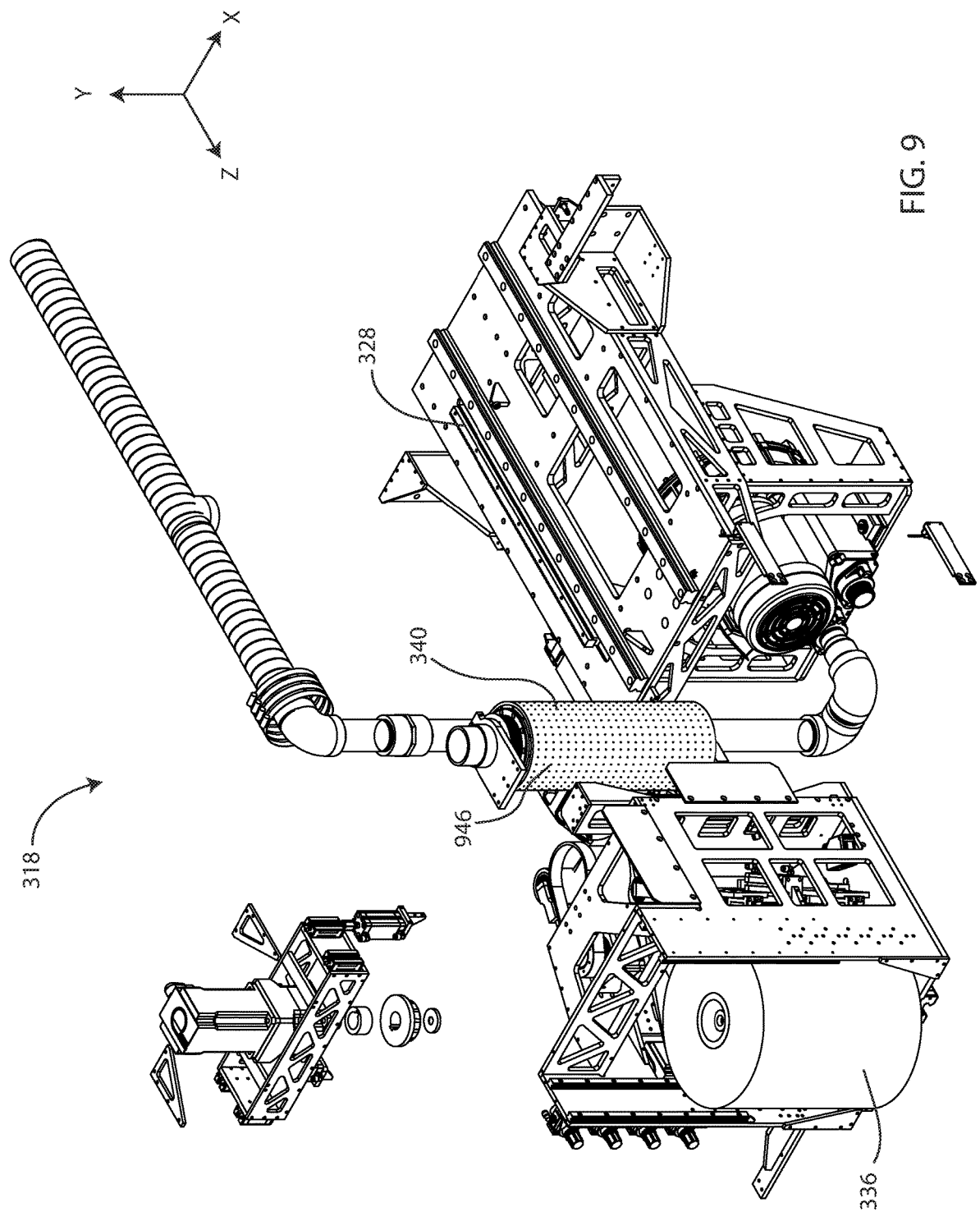
FIG. 9 is a partially exploded view of a masking system in accordance with various embodiments herein.

FIG. 9 shows a partially exploded view of the application head 320. FIG. 9 shows the vacuum roller 340 and the film roll 336. FIG. 9 further shows a portion of the z-axis movement element 328.

Figure 11:
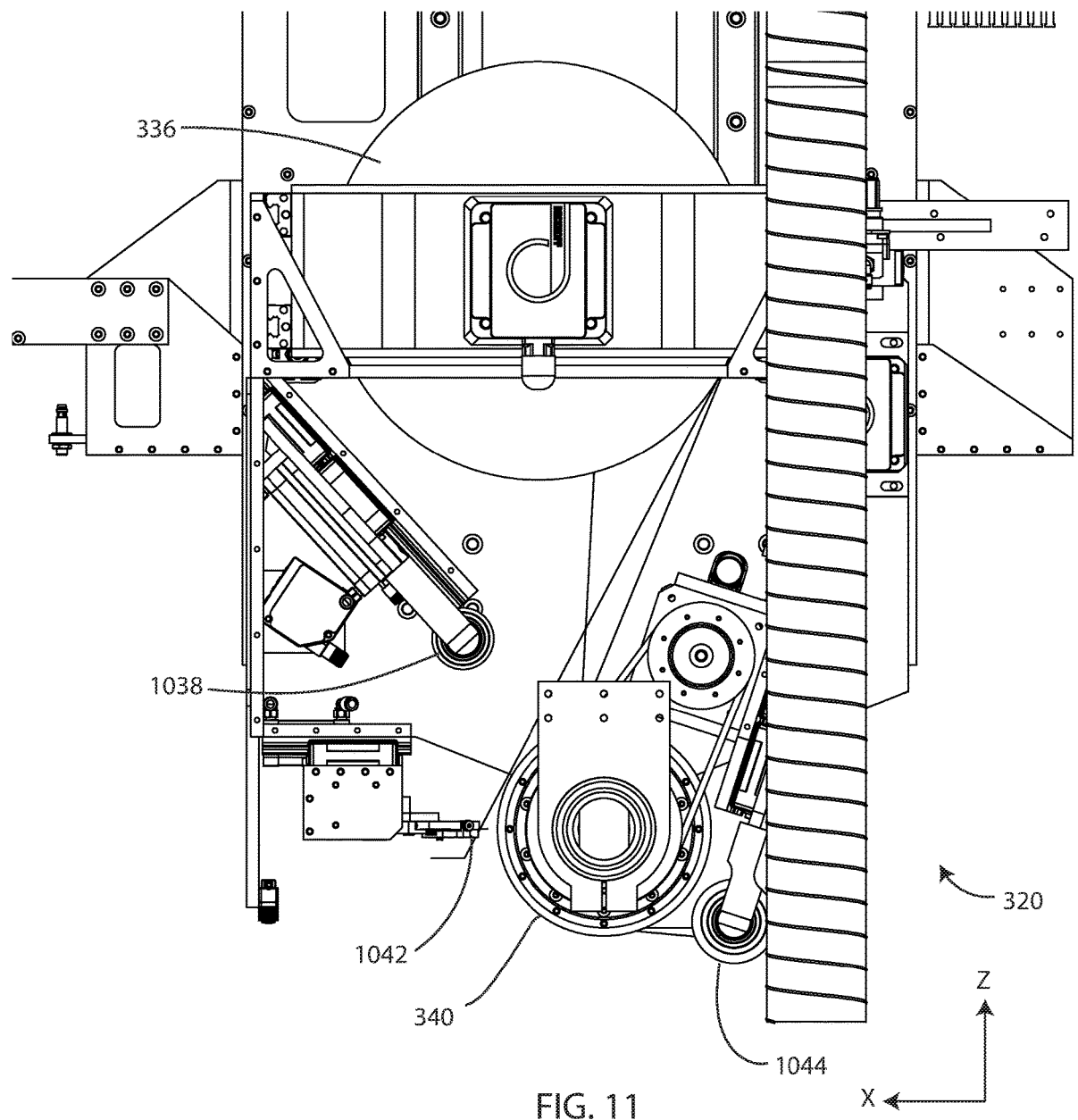
FIG. 11 is a top view of a portion of a masking system in accordance with various embodiments herein.

FIG. 10 shows a top view of a portion of the masking system 318 in accordance with various embodiments herein. FIG. 11 shows a close-up view of a portion of FIG. 10.

As mentioned above, the application head 320 can include a guide element 1038, a vacuum roller 340, a cutting element 1042, and a wiper element 1044. In some embodiments, the guide element 1038 can be configured to contact the inner surface of the film between the film roll 336 and the vacuum roller 340. In other embodiments, the guide element 1038 can be arranged to contact the outer surface of the film. In some embodiments the guide element 1038 can include a roller, a blade, or a projection. The guide element 1038 can be moved towards the film and away from the film to vary the film's path between the film roll 336 and the vacuum roller 340 and, as a result, vary the spot at which the film contacts the vacuum roller 340. In some embodiments, the guide element 1038 can have a fully retracted position which can provide space between the guide element 1038 and the vacuum roller 340, such as to allow for easy loading of the film onto the vacuum roller 340. In some embodiments, the guide element 1038 can have a second position or a fully extended position, which can provide for a constant position for the film to contact the vacuum roller 340 regardless of the diameter of the film roll 336, as discussed below in FIG. 15. In various embodiments, the guide element 1038 can be configured to contact an unwound portion of film between the film roll 336 and the vacuum roller 340 to maintain a constant tension of the film.

The cutting element 1042 can be configured to cut or otherwise separate a portion of the film from the remainder of the film, such as when a layer is about to be completed. In some embodiments, the cutting element 1042 can include a razor or other sharpened edge. In other embodiments, the cutting element 1042 can include a laser, a cutting wheel, or other cutting instrument. The cutting element 1042 can travel along an axis parallel to the y-axis to cut the film. In some embodiments, the film being cut can be positioned between the vacuum roller 340 and the cutting element 1042. In some embodiments, the cutting element 1042 can be arranged to cut the film on the vacuum roller 340, or between the film roll 336 and the vacuum roller 340. The cutting element 1042 can be perpendicular to a tangent line of the vacuum roller 340. In some embodiments, the cutting element 1042 can be disposed 90 degrees away from the portion of the vacuum roller 340 where the film leaves the vacuum roller 340, such that after cutting the vacuum roller 340 will still have a portion of the film on the vacuum roller 340. The vacuum roller can continue to rotate, as the application head 320 travels along the workpiece 100, to apply the remainder of the separated portion of film to the workpiece 100.

As discussed above, the film leaving the vacuum roller 340 can be placed onto the workpiece 100. The wiper element 1044 can follow the vacuum roller 340 along the x-axis. The wiper element 1044 can be configured to contact the film applied to the workpiece 100. The wiper element 1044 can be configured to smooth out the film applied to the workpiece 100. In some embodiments, the wiper element 1044 can ensure that the film is consistently in contact with the workpiece 100. In some embodiments, the wiper element 1044 can include a roller, a projection, or an edge to contact the film.

Figure 12:
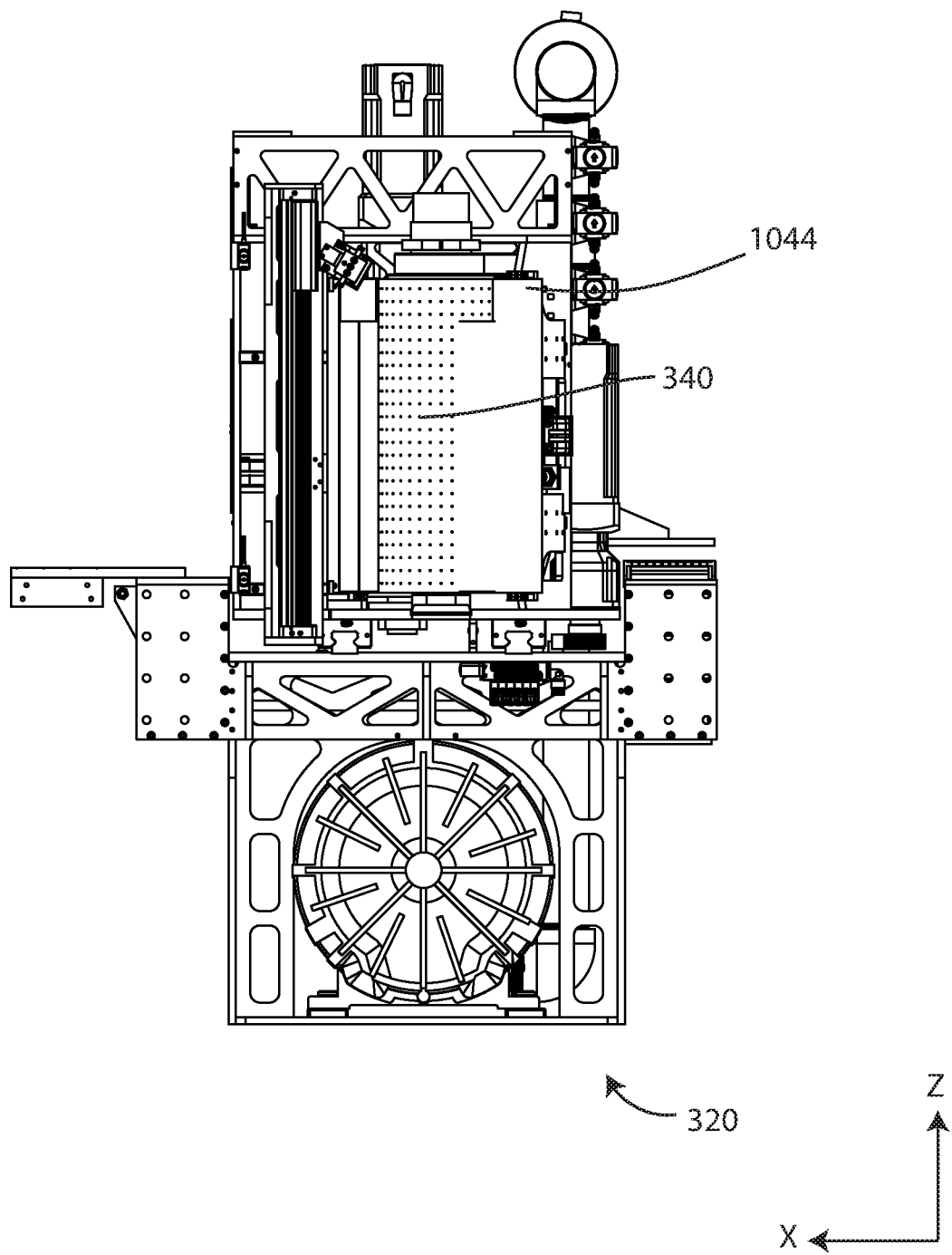
FIG. 12 is a back view of a portion of a masking system in accordance with various embodiments herein.
Figure 13:
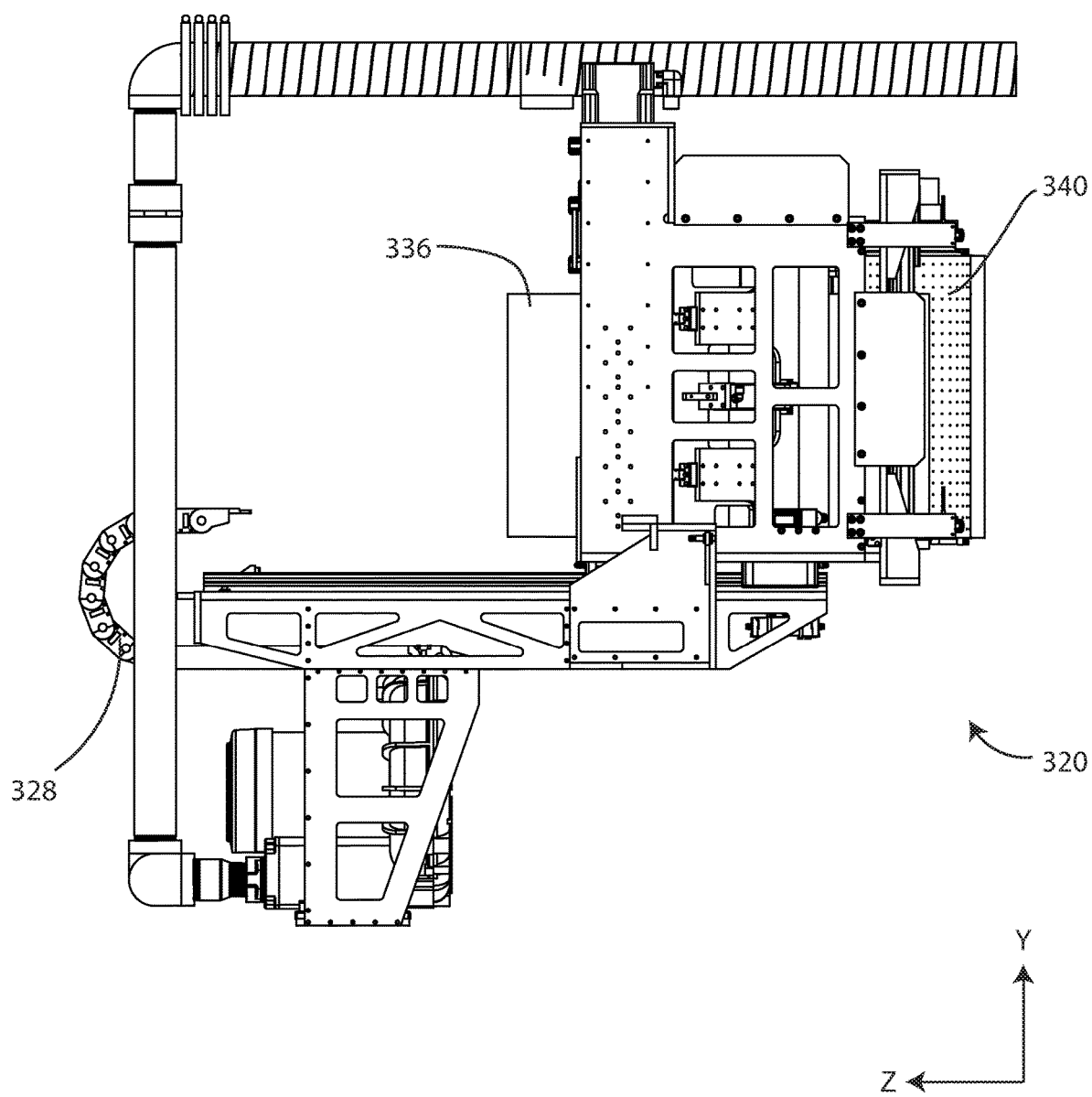
FIG. 13 is a side view of a portion of a masking system in accordance with various embodiments herein.
Figure 14:
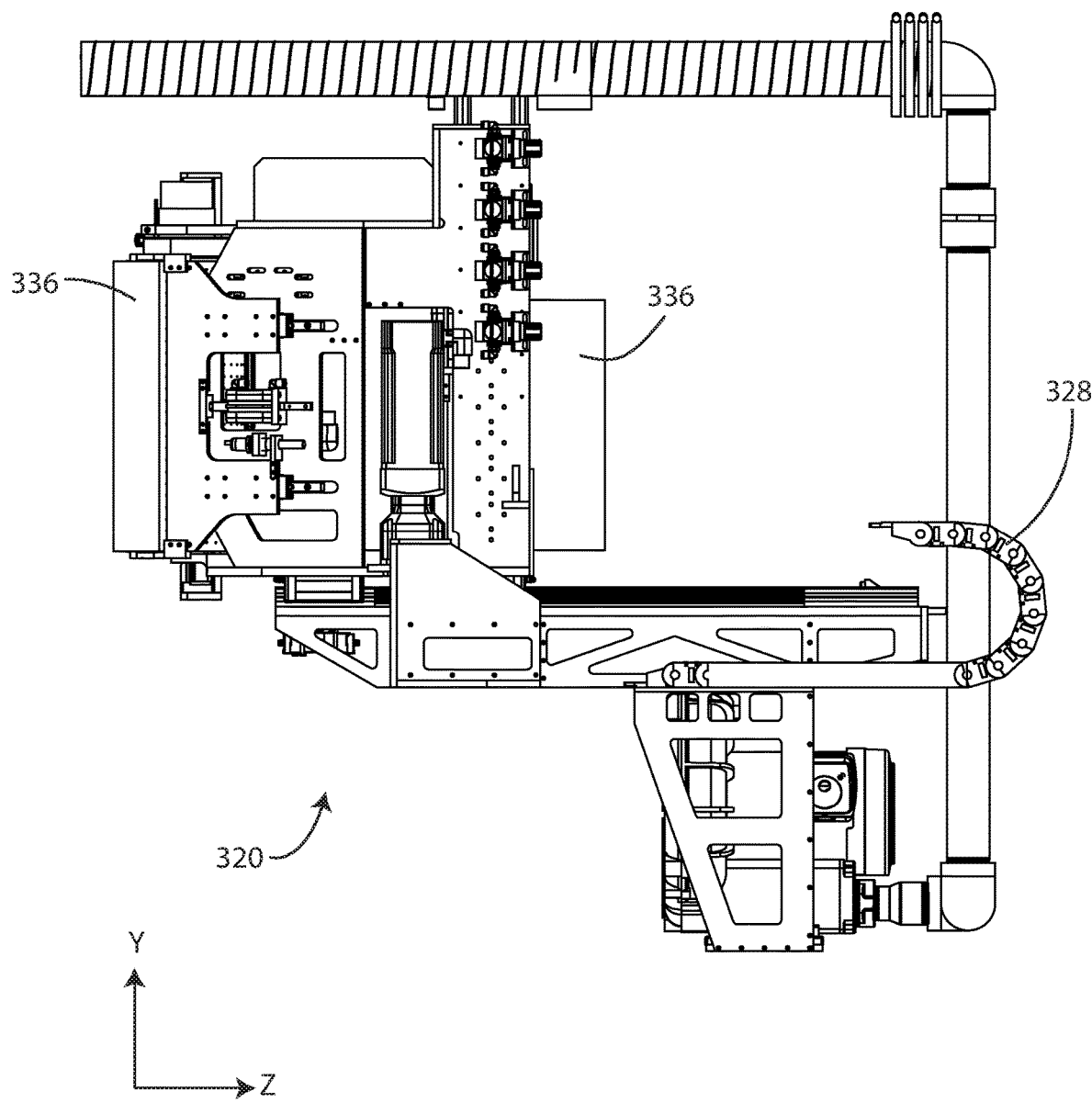
FIG. 14 is a side view of a portion of a masking system in accordance with various embodiments herein.

FIG. 12 shows a back view of the application head 320 of a masking system in accordance with various embodiments herein. FIG. 12 shows a view of the application head 320 as seen from where a workpiece could be located relative to the application head 320. FIGS. 13 and 14 shown opposite side views of the application head 320.

Figure 15:
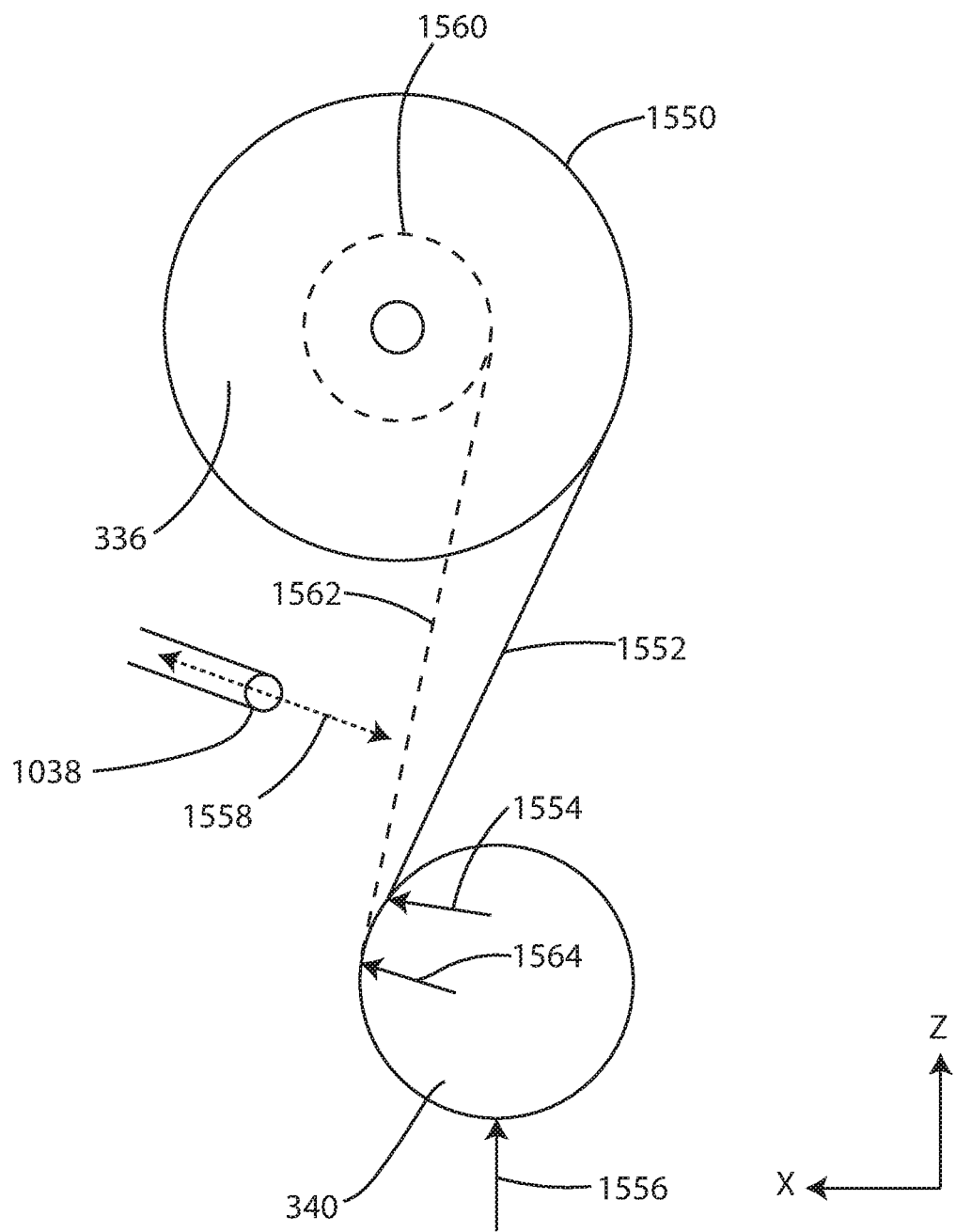
FIG. 15 is a schematic of a top view of a portion of a masking system in accordance with various embodiments herein.
Figure 16:
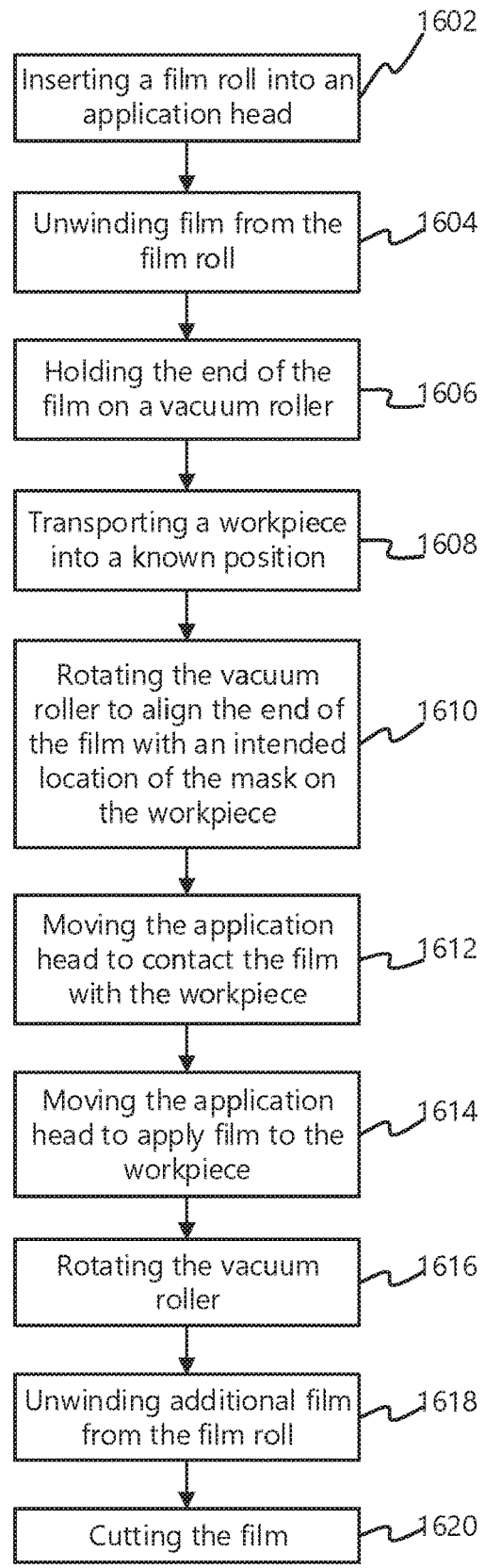
FIG. 16 is a flowchart depicting a method in accordance with various embodiment herein.

FIG. 15 shows a schematic top view of a portion of the masking system 318 in accordance with various embodiments herein. In various embodiments, the guide element 1038 can be configured to maintain a constant angular position of first contact between the film and the vacuum roller 340. As such, the system 318 can always know the amount of film and the location of the film on the vacuum roller 340.

As film is unwound from the film roll 336, the diameter of the film roll will decrease, such as seen in FIG. 15 by comparing a full or initial roll 1550 with a partially unwound roll 1560. It should be understood that the partially unwound roll 1560 represents the outer circumference of the film roll 336 after film has been unwound.

In the example illustrated in FIG. 15, film 1552 that has been unwound from the full film roll 1550 would first contact the vacuum roller at point 1554. Film 1562 that has been unwound from the partially unwound film roll 1560 later in time would first contact the vacuum roller 340 at point 1564. In these example film paths, a path of the film 1552 and a path of the film 1562 has not been altered by a guide element. In various embodiments, the guide element 1038 can be moved along axis 1558 to come into contact with the unwound film from film roll 336 prior to the unwound film contacting the vacuum roller 340 to maintain a particular angular position of first contact between the unwound film and the vacuum roller 340. In some embodiments, the guide element 1038 can be configured to maintain an angular position of first contact between the unwound film and the vacuum roller 340 relative to the position at which the film on the vacuum roller 340 contacts the workpiece (represented by point 1556).

For example, the guide element 1038 can be extended along its axis 1558 so that the guide element 1038 contacts the film 1562 from the partially unwound film roll 1560 to cause the angular position of its first contact point with the vacuum roller to be at point 1554, identical or very close to the angular position of the film 1552 from a full roll 1550, when the guide element 1038 does not contact film 1552. In other examples, the guide element 1038 is extended to contact both a film 1552 from a full roll 1550 and a film 1562 from a partially unwound roll 1560, and to cause both film 1552 and film 1562 to have the same angular position of a first contact point. The guide element 1038 can provide tension to the unwound portion of the film.

It should be understood that descriptions of an angular position of first contact with the vacuum roller 340 refer to an angular position along a perimeter footprint of the vacuum roller 340 or a cross-section of the vacuum roller 340 when viewed from above along the vacuum roller axis, and does not refer to a particular location on the vacuum roller 340 itself, which is rotating during operation.

Sequence of Operation

A film roll 336 can be inserted into the application head 320, such as to provide the masking film for the system. The film from the film roll 336 can be partially unwound and placed onto the vacuum roller 340 with the inner surface of the film (with the adhesive) facing away from the vacuum roller 340. The vacuum force of the vacuum roller 340 can hold the film on the vacuum roller 340. The guide element 1038 can extend between the film roll 336 and the vacuum roller 340 to ensure a smooth and/or consistent placement of the film on the vacuum roller 340.

During an initiation process, the cutting element 1042 can cut the film on the vacuum roller 340 and the no-longer-attached portion of the film can be removed and discarded. Cutting the film on the vacuum roller 340 can establish a known location of the film end on the vacuum roller 340. As such, the known location of the film end on the vacuum roller can be aligned with a known location of the workpiece to apply the film at the desired location of the workpiece.

The vacuum roller 340 can be rotated in preparation for applying the film to the workpiece 100, such as to align the edge of the film with the workpiece 100. The vacuum roller 340 can maintain a known edge of the film on the vacuum roller 340.

The workpiece 100 can be conveyed into the masking system 318 via the workpiece movement element 334. The masking system 318 can measure the height and length of the workpiece 100 as the workpiece 100 enters the system 318, such as at a workpiece entry. The workpiece 100 can be stopped at a known location within the system 318, such as on the workpiece support 322. The system 318 can calculate or determine the desired size, shape, and perimeter of the mask based on the measurements of the height and length of the workpiece and the desired unmasked perimeter of the workpiece.

The application head 320 can be moved to a location where the film on the vacuum roller 340 touches the workpiece 100, such as to allow the adhesive on the film to bond to the workpiece 100. The unwind motor coupled to the film roll 336 can unwind the film roll 336 at the same speed at which the vacuum roller 340 dispenses film onto the workpiece 100, such as by rotating the film roll 336 or the spool. The vacuum roller 340 is synchronously rotated as the application head 320 moves along the x-axis.

The wiper element 1044 can extend from the application head 320 to smooth the film on the workpiece 100. The unwind motor can be further controlled to maintain a desired amount of tension on the film. The unwind motor can have a variable speed, such as to account for changes in speed at which the mask is being applied to the workpiece or to account for changes to the diameter of the film roll 336. During the application of a first layer of film on the workpiece, a fine-tuning measurement of the length of the workpiece can be made, such that subsequent layers include the same length resulting in the desired unmasked perimeter around the mask.

As the application head 320 nears the end of a layer, the cutting element 1042 can cut the film to separate the layer being applied to the workpiece from the remainder of the film. The application head 320 can further move along the x-axis after the cut has been made, such as to dispense the remainder of the layer from the vacuum roller 340 onto the workpiece. In some embodiments, after the cut has been made, the application head 320 can move along the z-axis away from the workpiece 100, such that the next portion of film (intended to be the start of the next layer on the same workpiece or the first layer on a subsequent workpiece) does not get applied to the perimeter area at the end of the layer being applied. The wiper element 1044 can ensure the remainder of the layer being applied is properly applied to the workpiece 100.

Once a layer is completed, the application head 320 can retract along the z-axis a safe distance. The application head 320 can then move along the x-axis and the y-axis to position itself in the desired location to apply the next layer. Additional layers can be applied until the mask is complete.

Method

Many different methods are contemplated herein, including, but not limited to, methods of making, methods of using, and the like. Aspects of system/device operation described elsewhere herein can be performed as operations of one or more methods in accordance with various embodiments herein.

Various embodiments provide a method of applying a mask to a workpiece. The method can include a film roll into an application head 1602. The film roll can include film wrapped around a spool. The method can include unwinding film from the film roll, at least partially, to place a first end of the film from the film roll on a vacuum roller of the application head 1604. The method can include holding the end of the film from the film roll on the vacuum roller with a vacuum force 1606. The method can include transporting a workpiece into a known position relative to the vacuum roller 1608. The method can include rotating the vacuum roller to align the end of the film from the film roll with an intended location of the mask 1610. The method can include moving the application head into a position where film on the vacuum roller contacts the workpiece thereby attaching film to the workpiece via an adhesive on the film 1612. The method can include moving the application head along the workpiece to apply film to the workpiece 1614. The method can include rotating the vacuum roller as the application head moves along the workpiece 1616. The method can include unwinding additional film from the film roll to provide the additional film to the vacuum roller as film is applied to the workpiece 1618. The method can include cutting the film from the film roll 1620.

In an embodiment, cutting the film from the film roll occurs at a location between the film roll and the vacuum roller or a location on the vacuum roller to separate a first portion of film from a second portion of film, wherein the first portion of film comprises the first end and a second end, and the second portion of film comprises the film on the film roll.

In an embodiment, the method can further include applying the second end of the first portion of film onto the workpiece by moving the application head along the workpiece after the first portion of film has been separated from the second portion of film.

In an embodiment, the method can further include measuring a length and a width of the workpiece as the workpiece is transported to the known position.

In an embodiment, the method can further include calculating a size of the mask to be applied to the workpiece based on the measured height and length of the workpiece.

In an embodiment, the method can further include moving a guide element into contact with the film between the film roll and the vacuum roller.

In an embodiment, the method can further include following the vacuum roller with a wiper of the application head that contacts the film applied to the workpiece.

In an embodiment, the method can further include moving the application head away from the workpiece after the film has been cut.

It should be understood that various method steps can occur at the same point in time or can overlap in time. For example, transporting of the workpiece 1608 can happen simultaneous with, before, or after steps 1602, 1604, 1606, and 1610. In many example methods, steps 1614, 1616, and 1618 will occur simultaneously. It should also be understood that various method steps can be repeated to obtain a completed mask, such as shown in FIG. 2.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A masking system to apply a mask to a workpiece, comprising:
    a frame structure comprising a workpiece support, wherein the workpiece support is configured to maintain the location of the workpiece while the mask is applied to the workpiece;
    an application head configured to apply film to a workpiece to define the mask, wherein the application head comprises:
        a vacuum roller comprising a rotatable cylindrical body with an outer surface;
        a film roll comprising film wrapped around a spool;
        a cutting element configured to cut the film to separate a portion of the film from a remainder of film on the film of the film roll, wherein the cutting element is arranged to cut the film on the vacuum roller, and
        a guide element disposed between the film roll and the vacuum roller, wherein the guide element is moveable, wherein the guide element is configured to contact an unwound portion of the film to maintain a constant tension of the film between the film roll and the vacuum roller;
    an X-axis movement element configured to move the application head relative to the frame structure along an X-axis;
    a Y-axis movement element configured to move the application head relative to the frame structure along a Y-axis;
    a Z-axis movement element configured to move the application head relative to the frame structure along a Z-axis; and
    a workpiece movement element configured to move the workpiece relative to the frame structure;
    wherein the x-axis movement element is configured to move the application head in a +x direction while applying the film to the workpiece,
    wherein after cutting the film on the vacuum roller, the z-axis movement element is configured to move the application head in a +z direction and the x-axis movement element is configured to move the application head further in the +x direction until the separated portion of film has been applied to the workpiece.

2. The masking system of claim 1, wherein the application head further comprises a wiper element arranged to follow the vacuum roller, such that the wiper element contacts film that has been applied to the workpiece.

3. The masking system of claim 1, wherein the workpiece movement element comprises a conveyor belt, motorized rollers, or a robot arm.

4. The masking system of claim 1, wherein the frame structure comprises a workpiece entry and a workpiece exit, wherein the workpiece entry comprises a workpiece measuring element configured to measure a height of the workpiece, a width of the workpiece, or the height and the width of the workpiece.

5. The masking system of claim 4, wherein the masking system is configured to calculate the desired mask size based on the measured height of the workpiece, the measured width of the workpiece, or the measured height and width of the workpiece.

6. The masking system of claim 1, wherein the guide element is configured to maintain a constant angular position of first contact between the film and the vacuum roller.

7. The masking system of claim 1, wherein the film roll comprises an unwind motor configured to rotate the spool.

8. The masking system of claim 7, wherein the film roll comprises a film roll diameter sensor configured to measure a diameter of the film roll.

9. The masking system of claim 8, wherein the unwind motor has a variable unwind speed, wherein the unwind speed is adjusted to ensure a tension of an unwound film portion remains constant.

10. The masking system of claim 8, wherein the unwind motor is configured to unwind film from the film roll at the same speed at which film is applied to the workpiece from the vacuum roller.

11. The masking system of claim 1,
wherein the Y-axis movement element is configured to move the application head along the Y-axis after the separated portion of film has been applied to the workpiece.

12. A masking system to apply a mask to a workpiece, comprising:
- a frame structure comprising a workpiece support, wherein the workpiece support is configured to maintain the location of the workpiece while the mask is applied to the workpiece;
- an application head configured to apply film to a workpiece to define the mask, wherein the mask is applied to an inside area of a surface of the workpiece and an unmasked perimeter region extends around the mask on the surface of the workpiece, wherein the application head comprises:
  - a vacuum roller comprising a rotatable cylindrical body with an outer surface;
  - a film roll comprising:
    - a film wrapped around a spool,
    - an unwind motor configured to rotate the spool, and
    - a film roll diameter sensor configured to measure the diameter of the film roll,
    - wherein the unwind motor has a variable unwind speed, wherein the unwind speed is adjusted to ensure a tension of an unwound film portion remains constant, wherein the unwind motor is configured to unwind film from the film roll at the same speed at which film is applied to the workpiece from the vacuum roller;
  - a cutting element configured to cut the film to separate a portion of the film from a remainder of film on the film of the film roll, wherein the cutting element is arranged to cut the film on the vacuum roller, such that a cut end of the film connected to the film roll is maintained in a known location on the vacuum roller;
  - a guide element disposed between the film roll and the vacuum roller, wherein the guide element is moveable, wherein the guide element is configured to contact an inner surface of the film to maintain a constant tension of the film between the film roll and the vacuum roller, wherein the guide element is configured to maintain a constant angular position of first contact between the film and the vacuum roller as the diameter of the film roll changes; and
  - a wiper element arranged to follow the vacuum roller, such that the wiper element contacts film that has been applied to the workpiece;
- an X-axis movement element configured to move the application head relative to the frame structure along an X-axis;
- a Y-axis movement element configured to move the application head relative to the frame structure along a Y-axis;
- a Z-axis movement element configured to move the application head relative to the frame structure along a Z-axis; and
- a workpiece movement element configured to move the workpiece relative to the frame structure;
- wherein the x-axis movement element is configured to move the application head in a +x direction while applying the film to the workpiece,
- wherein after cutting the film on the vacuum roller, the z-axis movement element is configured to move the application head in a +z direction and the x-axis movement element is configured to move the application head further in the +x direction until the separated portion of film has been applied to the workpiece.

* * * * *